United States Patent
Izumi (10) Patent No.: US 7,080,087 B2
(45) Date of Patent: Jul. 18, 2006

(54) AUTOMATIC AGGREGATION METHOD, AUTOMATIC AGGREGATION APPARATUS, AND RECORDING MEDIUM HAVING AUTOMATIC AGGREGATION PROGRAM

(75) Inventor: Tadanori Izumi, Hyogo (JP)

(73) Assignee: Nihon Intersystems Co., Ltd., Osaka (JP)

( * ) Notice: Subject to any disclaimer, the term of this patent is extended or adjusted under 35 U.S.C. 154(b) by 436 days.

(21) Appl. No.: 09/872,499

(22) Filed: Jun. 1, 2001

(65) Prior Publication Data

US 2002/0010696 A1    Jan. 24, 2002

(30) Foreign Application Priority Data

Jun. 1, 2000   (JP) .............................. 2000-165152

(51) Int. Cl.
 *G06F 17/30*   (2006.01)
(52) U.S. Cl. .............................. 707/101; 707/1; 707/6; 707/10
(58) Field of Classification Search ................ 707/100, 707/1, 2, 101, 10, 6
 See application file for complete search history.

(56) References Cited

U.S. PATENT DOCUMENTS

| | | | | |
|---|---|---|---|---|
| 5,353,388 A | * | 10/1994 | Motoyama | 358/1.18 |
| 5,467,471 A | * | 11/1995 | Bader | 707/1 |
| 5,970,490 A | * | 10/1999 | Morgenstern | 707/10 |
| 6,023,715 A | * | 2/2000 | Burkes et al. | 715/514 |
| 6,078,913 A | * | 6/2000 | Aoki et al. | 707/2 |
| 6,334,125 B1 | * | 12/2001 | Johnson et al. | 707/3 |
| 6,438,562 B1 | * | 8/2002 | Gupta et al. | 707/201 |

FOREIGN PATENT DOCUMENTS

| | | |
|---|---|---|
| JP | 4177460 | 6/1992 |
| JP | 9091268 | 4/1997 |
| JP | 11250150 | 9/1999 |
| JP | 2000067135 | 3/2000 |

\* cited by examiner

*Primary Examiner*—Frantz Coby
*Assistant Examiner*—CamLinh Nguyen
(74) *Attorney, Agent, or Firm*—Snell & Wilmer LLP (57) ABSTRACT

An automatic aggregation method for automatically aggregating a plurality of records using a computer, the plurality of records each including a plurality of items including a key parameter and a numerical value which is at least related to the key parameter, includes the steps of (a) inputting one of the plurality of records to the computer; (b) adding at least one node, representing contents of the input record, to a position, corresponding to the key parameter included in the input record, of a hierarchical tree; (c) updating a value of the at least one node added to the hierarchical tree and a value of a node on a level higher than that of the at least one node, in accordance with the numerical value included in the input record; and (d) repeating steps (a) through (c) until all the plurality of records are processed, thereby outputting an aggregation result for each of items of the key parameter.

7 Claims, 9 Drawing Sheets

| Shop | Product | Number of products ordered |
|------|---------|---------------------------|
| A1   | B2      | N1                        |

— Record #1

| Shop | Product | Number of products ordered |
|------|---------|---------------------------|
| A1   | B1      | N2                        |

— Record #2

| Shop | Product | Number of products ordered |
|------|---------|---------------------------|
| A1   | B3      | N3                        |

— Record #3

| Shop | Product | Number of products ordered |
|------|---------|---------------------------|
| A2   | B1      | N4                        |

— Record #4

FIG. 4

(a)  ROOT (0)

(b)  ROOT (N1)
     └─B2 (N1)
        └─A1 (N1)

(c)  ROOT (N1+N2)
     ├─B1 (N2)
     │  └─A1 (N2)
     └─B2 (N1)
        └─A1 (N1)

(d)  ROOT (N1+N2+N3)
     ├─B1 (N2)
     │  └─A1 (N2)
     ├─B2 (N1)
     │  └─A1 (N1)
     └─B3 (N3)
        └─A1 (N3)

(e)  ROOT (N1+N2+N3+N4)
     ├─B1 (N2+N4)
     │  ├─A1 (N2)
     │  └─A2 (N4)
     ├─B2 (N1)
     │  └─A1 (N1)
     └─B3 (N3)
        └─A1 (N3)

| | Node | Level | L Link | C Link | R Link | Value |
|---|---|---|---|---|---|---|
| 1 | ROOT | 0 | 4 | −1 | −1 | N1+N2+N3+N4 |
| 2 | B2 | 1 | 3 | 1 | 6 | N1 |
| 3 | A1 | 2 | −1 | 2 | −1 | N1 |
| 4 | B1 | 1 | 5 | 1 | 2 | N2+N4 |
| 5 | A1 | 2 | −1 | 4 | 8 | N2 |
| 6 | B3 | 1 | 7 | 1 | −1 | N3 |
| 7 | A1 | 2 | −1 | 6 | −1 | N3 |
| 8 | A2 | 2 | −1 | 4 | −1 | N4 |

Input-output model (Graph with nodes A, B, C, D and directed edges with weights: 200, 400, 200, 300, 300, 200)

Input data table

| | FROM | TO | Amount of money |
|---|---|---|---|
| 1 | D | B | 200 |
| 2 | D | A | 300 |
| 3 | B | C | 400 |
| 4 | A | B | 300 |
| 5 | C | D | 200 |
| 6 | A | C | 200 |

Input-output table

| TO\FROM | A | B | C | D | SUM |
|---|---|---|---|---|---|
| A | | 300 | 200 | | 500 |
| B | | | 400 | | 400 |
| C | | | | 200 | 200 |
| D | 300 | 200 | | | 500 |
| SUM | 300 | 500 | 600 | 200 | 1600 |

Hierarchical binary search tree representation

```
From          To
A (500) ─── B (300)
        └── C (200)
B (400) ─── C (400)
C (200) ─── D (200)
D (500) ─── A (300)
        └── B (200)
```

Input-output model formula $$X = AX + u$$

XML representation

```
<SYS>
  <A> 500
    <B> 300 </B>
    <C> 200 </C>
  </A>
  <B> 400
    <C> 400 </C>
  </B>
  <C> 200
    <D> 200 </D>
  </C>
  <D> 500
    <A> 300 </A>
    <B> 200 </B>
  </D>
</SYS>
```

AUTOMATIC AGGREGATION METHOD, AUTOMATIC AGGREGATION APPARATUS, AND RECORDING MEDIUM HAVING AUTOMATIC AGGREGATION PROGRAM

BACKGROUND OF THE INVENTION

1. Field of the Invention

The present invention relates to an automatic aggregation method, an automatic aggregation apparatus, and a recording medium having a program, stored thereon, for causing the automatic aggregation apparatus to execute the automatic aggregation method.

2. Description of the Related Art

Conventionally, a plurality of records are automatically aggregated by, for example, first accumulating the plurality of records in a buffer memory and then sorting the plurality of records in accordance with a key parameter.

However, the above-described method has the following problems as the number of records to be aggregated increases: (i) a larger capacity buffer memory needs to be prepared; and (ii) it takes a longer period of time to sort the plurality of records.

Due to the widespread use of the Internet, there can be cases where hundreds of thousands of records sent from all over the world are accumulated in a computer of the aggregation center. The above-mentioned conventional method requires an unbearably long time period to aggregate such a great number of records.

SUMMARY OF THE INVENTION

According to one aspect of the invention, an automatic aggregation method for automatically aggregating a plurality of records using a computer, the plurality of records each including a plurality of items including a key parameter and a numerical value which is at least related to the key parameter, includes the steps of (a) inputting one of the plurality of records to the computer; (b) adding at least one node, representing contents of the input record, to a position, corresponding to the key parameter included in the input record, of a hierarchical tree; (c) updating a value of the at least one node added to the hierarchical tree and a value of a node on a level higher than that of the at least one node, in accordance with the numerical value included in the input record; and (d) repeating steps (a) through (c) until all the plurality of records are processed, thereby outputting an aggregation result for each of items of the key parameter.

In one embodiment of the invention, the hierarchical tree is represented by a table including a pointer pointing to one node on a level lower by one than that of each node included in the hierarchical tree, a pointer pointing to one node on the same level as that of each node included in the hierarchical tree, and a pointer pointing to one node on a level higher by one than that of each node included in the hierarchical tree.

In one embodiment of the invention, the automatic aggregation method further includes the step of converting the aggregation result for each of the items of the key parameter into the Extensible Markup Language.

According to another aspect of the invention, an automatic aggregation apparatus for automatically aggregating a plurality of records using a computer, the plurality of records each including a plurality of items including a key parameter and a numerical value which is at least related to the key parameter, includes a control section for executing automatic aggregation processing. The automatic aggregation processing includes the steps of (a) inputting one of the plurality of records to the computer; (b) adding at least one node, representing contents of the input record, to a position, corresponding to the key parameter included in the input record, of a hierarchical tree; (c) updating a value of the at least one node added to the hierarchical tree and a value of a node on a level higher than that of the at least one node, in accordance with the numerical value included in the input record; and (d) repeating steps (a) through (c) until all the plurality of records are processed, thereby outputting an aggregation result for each of items of the key parameter.

In one embodiment of the invention, the hierarchical tree is represented by a table including a pointer pointing to one node on a level lower by one than that of each node included in the hierarchical tree, a pointer pointing to one node on the same level as that of each node included in the hierarchical tree, and a pointer pointing to one node on a level higher by one than that of each node included in the hierarchical tree.

In one embodiment of the invention, the automatic aggregation apparatus further includes the step of converting the aggregation result for each of the items of the key parameter into the Extensible Markup Language.

According to still another aspect of the invention, a computer readable recording medium having a program, stored thereon, for causing a computer to execute automatic aggregation processing for automatically aggregating a plurality of records, the plurality of records each including a plurality of items including a key parameter and a numerical value which is at least related to the key parameter, the automatic aggregation processing. The automatic aggregation processing includes the steps of (a) inputting one of the plurality of records to the computer; (b) adding at least one node, representing contents of the input record, to a position, corresponding to the key parameter included in the input record, of a hierarchical tree; (c) updating a value of the at least one node added to the hierarchical tree and a value of a node on a level higher than that of the at least one node, in accordance with the numerical value included in the input record; and (d) repeating steps (a) through (c) until all the plurality of records are processed, thereby outputting an aggregation result for each of items of the key parameter.

Thus, the invention described herein makes possible the advantages of providing an automatic aggregation method and an automatic aggregation apparatus for instantaneously aggregating a great number of records, and a recording medium having a program, stored thereon, for causing the automatic aggregation apparatus to execute the automatic aggregation method.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
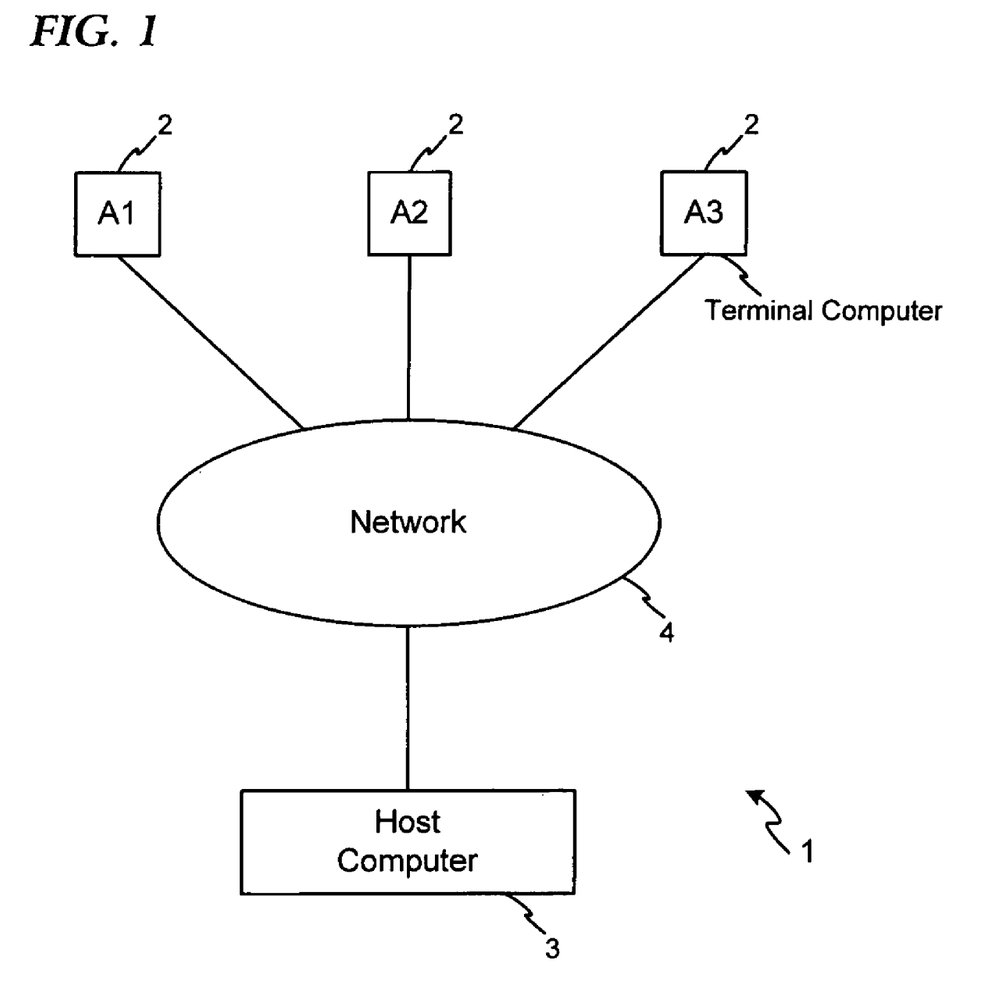
FIG. 1 shows an exemplary structure of a computer system 1 in an example according to the present invention.

FIG. 1 shows an exemplary structure of a computer system 1 according to one example of the present invention.

The computer system 1 includes a plurality of terminal computers 2, a host computer 3, and a network 4 for connecting the plurality of terminal computers 2 and the host computer 3 to each other.

The network 4 is an arbitrary network, and can be, for example, the Internet. Alternatively, the plurality of terminal computers 2 and the host computer 3 can be directly connected to each other through an electric line such as, for example, a cable.

Each of the plurality of terminal computers 2 is installed in, for example, a shop. In the example shown in FIG. 1, one terminal computer 2 is installed in shop A1, another terminal computer 2 is installed in shop A2, and still another terminal computer 2 is installed in shop A3. The number of terminal computers 2 connected to the host computer 3 through the network 4 is not limited to three, but can be any integer of two or greater.

The host computer 3 is installed in, for example, an aggregation center.

Records are sent from each terminal computer 2 installed in the respective shop to the host computer 3 one by one. The host computer 3 receives and aggregates the records.

Figure 2:
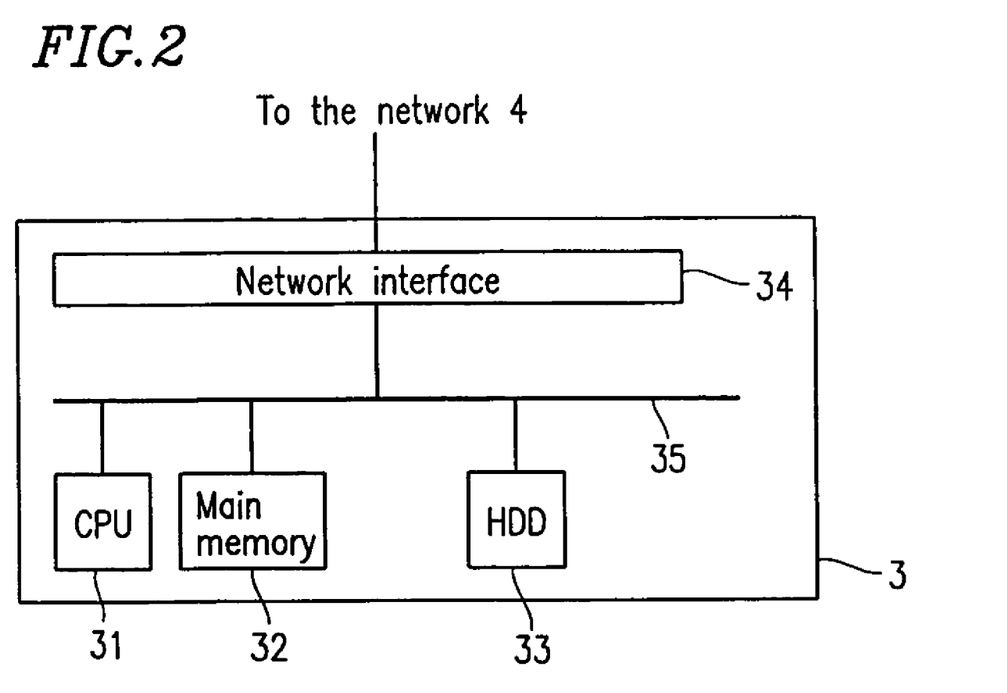
FIG. 2 shows a structure of a host computer 3.

FIG. 2 shows an exemplary structure of the host computer 3.

The host computer 3 includes a CPU 31, a main memory 32, a hard disk device (HDD) 33, and a network interface 34. These elements 31 through 34 are connected to one another by, for example, a bus 35. As the HDD 33, an any type of memory is usable.

The HDD 33 has a program for automatic aggregation processing (hereinafter, referred to as an "automatic aggregation processing program") stored thereon. Alternatively, the automatic aggregation processing program can be stored on any type of computer-readable recording medium such as, for example, a flexible disk, a CD-ROM, or a DVD-ROM (not shown). The automatic aggregation processing program which is stored on the recording medium is loaded on the HDD 33 via an input device (for example, a disk drive).

The CPU 31 executes the automatic aggregation processing program stored on the HDD 33. Then, the host computer 3 acts as an automatic aggregation apparatus for automatically aggregating a plurality of records which are sent from the plurality of terminal computers 2.

A part of the automatic aggregation processing program or a part of the data to be processed is transferred to the main memory 32 when necessary. The CPU 31 is capable of accessing the main memory 32 at a high speed.

Hereinafter, a specific example of automatic aggregation processing according to the present invention will be described. In this example, a record including a product name and the number of the products ordered is input to the terminal computer 2 in each shop, and the total number of the products ordered is aggregated.

Figure 3:
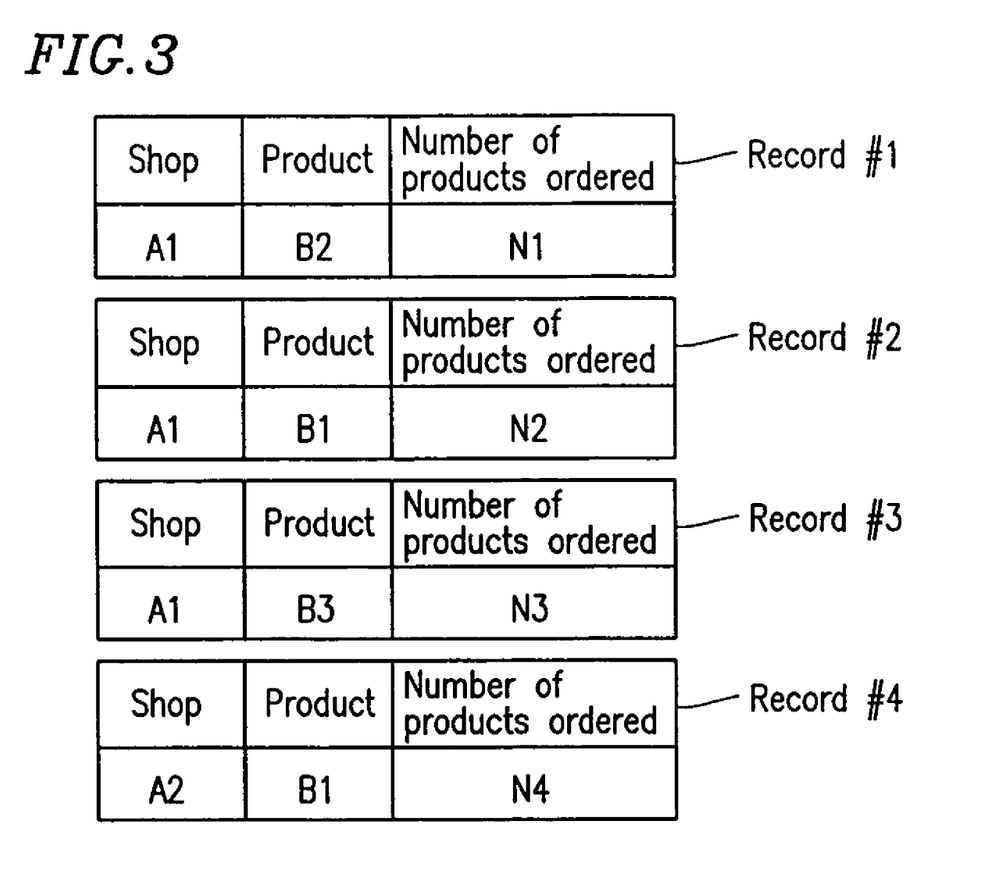
FIG. 3 shows an exemplary format of records.

FIG. 3 shows an exemplary format of the records which are sent from the terminal computers 2 to the host computer 3. The format is designed in conformity with a prescribed input form.

In the example shown in FIG. 3, each record includes parameters "shop", "product" and "number of products ordered", i.e., a numerical value related to the product. In this example, the "product" is the key parameter.

Record #1 shows that the shop code is A1, the product code is B2, and the number of the products having the product code B2 ordered is N1. One product code is assigned to each of product items categorized as the "product". Hereinafter, record #1, for example, will be represented as (A1, B2, N1). Following this format, records #1 through #4 will be represented as follows:

Record #1: (A1, B2, N1)
Record #2: (A1, B1, N2)
Record #3: (A1, B3, N3)
Record #4: (A2, B1, N4)

It is assumed that records #1 through #4 are sequentially input to the host computer 3, starting from record #1.

Figure 4:
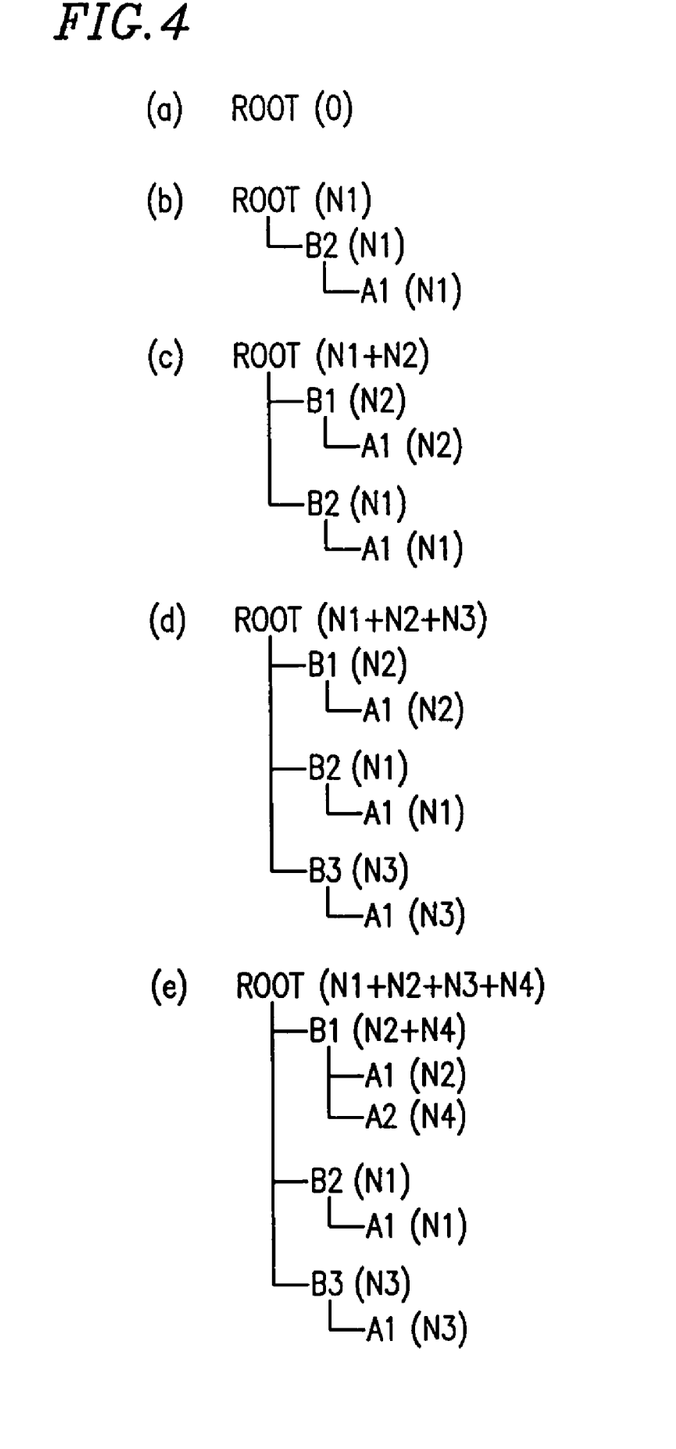
FIG. 4 shows a manner of at least one node corresponding to each record being added to a hierarchical tree.

FIG. 4 shows a manner in which, as records #1 through #4 are sequentially input to the host computer 3, at least one node corresponding to each record is added to a hierarchical tree.

The processing of adding at least one node corresponding to each record is performed by execution of the automatic aggregation processing program by the CPU 31 (FIG. 2). The hierarchical tree can be of any type which has a plurality of hierarchical levels. The hierarchical tree can be, for example, a hierarchical binary search tree. The hierarchical tree is stored in the HDD 33 (FIG. 2).

In FIG. 4, (a) shows an initial state of the hierarchical tree (having only a ROOT node). In the initial state, the value of the ROOT node is zero. In FIG. 4, the numerical value in the parenthesis following each node represents the value of the node.

Still referring to FIG. 4, (b) shows a state where node B2 and node A1 representing the contents of record #1 are added to the hierarchical tree.

The values of node B2 and node A1 and the value of the ROOT node in the hierarchical level higher than those of node B2 and node A1 are updated by the number of products ordered shown in record #1 (i.e., N1).

In FIG. 4, (c) shows a state where node B1 and node A1 representing the contents of record #2 are added to the hierarchical tree.

As described above, the "product" is the key parameter. The product item having the product code B1 should be placed before the product item having the product code B2. Accordingly, node B1 is added to a position closer to the ROOT node than node B2. In this manner, at least one node corresponding to the contents of the input record is added to a position corresponding to the key parameter included in the input record.

The values of node B1 and node A1 which have been added to the hierarchical tree and the value of the ROOT node which is on the hierarchical level higher than those of node B1 and node A1 are updated by the number of products ordered shown in record #2 (i.e., N2). As a result, the value of the ROOT node is (N1+N2).

In FIG. 4, (d) shows a state where node B3 and node A1 representing the contents of record #3 are added to the hierarchical tree.

The values of node B3 and node A1 which have been added to the hierarchical tree and the value of the ROOT node which is on the hierarchical level higher than those of node B3 and node A1 are updated by the number of products ordered shown in record #3 (i.e., N3). As a result, the value of the ROOT node is (N1+N2+N3).

In FIG. 4, (e) shows a state where node A2 representing the contents of record #4 is added to the hierarchical tree.

Since node B1 is already in the hierarchical tree, node B1 is not again added thereto. Node A2 is added to a position on a hierarchical level lower than that of node B1.

The value of node A2 which has been added to the hierarchical tree and the values of node B1 and the ROOT node which are on the hierarchical levels higher than that of node A2 are updated by the number of products ordered shown in record #4 (i.e., N4). As a result, the value of node B1 is (N2+N4), and the value of the ROOT node is (N1+N2+N3+N4).

The number of products ordered of each product item is obtained by referring to the values of nodes B1, B2 and B3 on the hierarchical level lower by one than that of the ROOT node. In FIG. 4, (e) shows that the number of products ordered having the product code B1 is (N2+N4) in total, the number of products ordered having the product code B2 is (N1) in total, and that the number of products ordered having the product code B3 is (N3) in total.

In this manner, the processing for aggregating the number of products ordered of each product item is performed by execution of the automatic aggregation processing program by the CPU 31 (FIG. 2).

Figure 5:
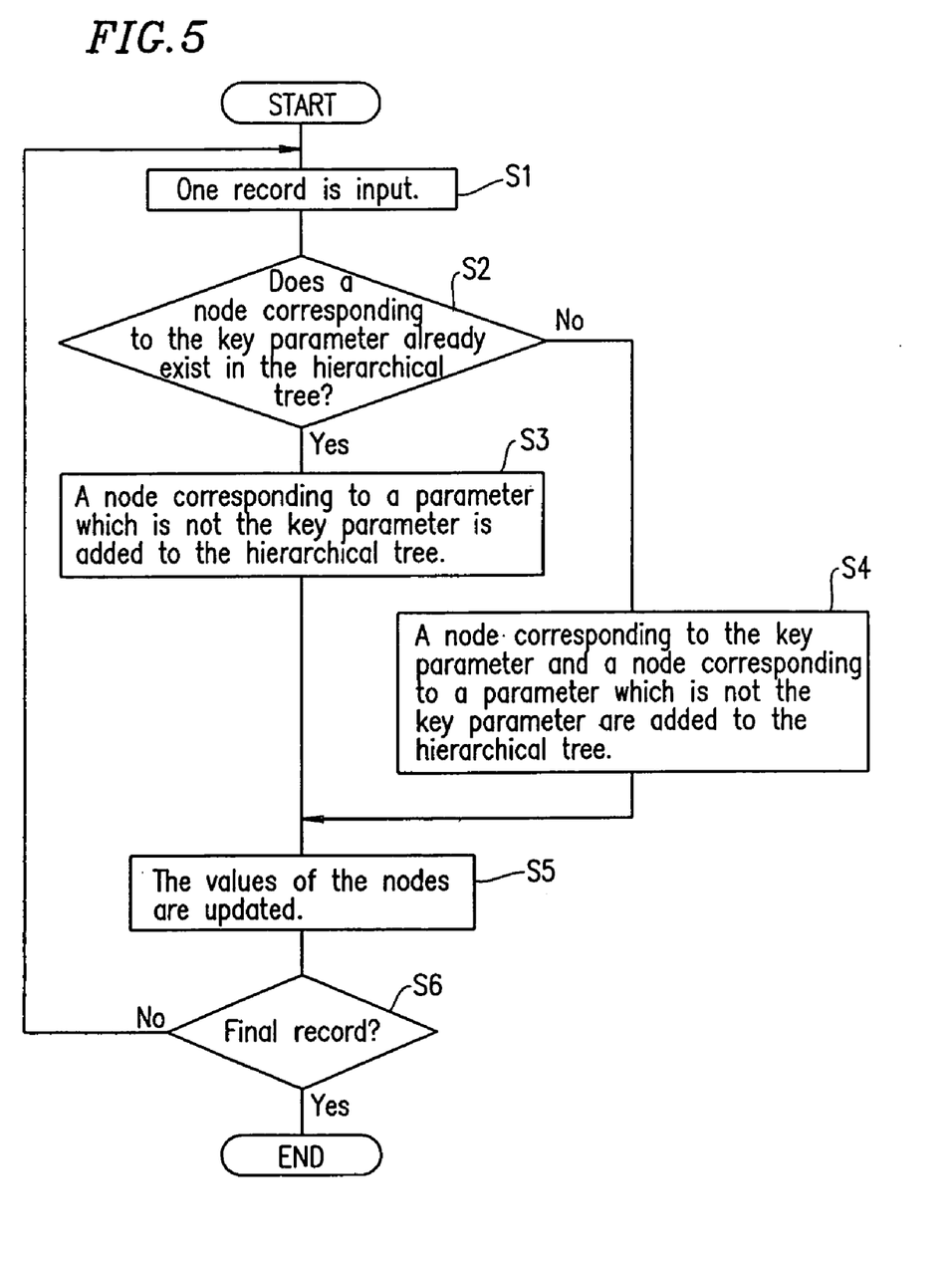
FIG. 5 is a flowchart illustrating a procedure of an automatic aggregation processing program.

FIG. 5 is a flowchart illustrating a procedure of the automatic aggregation processing program. The automatic aggregation processing program is executed by the CPU 31 (FIG. 2). Hereinafter, the automatic aggregation processing program will be described in detail.

Step S1: One record is input to the host computer 3.

Step S2: It is determined whether or not a node corresponding to the key parameter included in the input record (in the example of FIG. 3, the parameter of "product") already exists in the hierarchical tree or not. When it is determined that such a node already exists ("Yes" in step S2), the processing advances to step S3; and when it is determined that no such node exists ("No" in step S2), the processing advances to step S4.

Step S3: A node corresponding to a parameter which is included in the input record but is not the key parameter (hereinafter, referred to a "non-key parameter"; in the example shown in FIG. 3, the parameter of "shop") is added to the hierarchical tree. Such anode is added to a position on a level lower by one than that of the node corresponding to the key parameter.

Step S4: The node corresponding to the key parameter (in the example of FIG. 3, the parameter of "product") and the node corresponding to the non-key parameter (in the example shown in FIG. 3, the parameter of "shop") are added to the hierarchical tree. The node corresponding to the key parameter is added to a position on a hierarchical level corresponding to the key parameter. The position on the hierarchical level where the node corresponding to the key parameter is to be added is determined by the alphanumeric characters of the product code of the respective product item. The node corresponding to the non-key parameter is added to a position on a level lower by one than that of the node corresponding to the key parameter.

Step S5: The value of at least one node added to the hierarchical tree and a value of each of the nodes on the levels higher than that of the at least one node are updated by a numerical value included in the input record (in the example shown in FIG. 3, the "number of products ordered").

Step S6: It is determined whether the input record is the final record or not. The determination can be performed by the CPU 31 (FIG. 2) by, for example, counting the number of records which are to be aggregated. When it is determined that the input record is the final record ("Yes" in step S6), the processing is terminated; and when it is determined that the input record is not the final record ("No" in step S6), the processing goes back to step S1.

Steps S1 through S5 are repeated until the final record among a plurality of records to be aggregated is processed. Thus, the aggregation result for each item (product item in this example) of the key parameter can be obtained.

The aggregation result for each item of the key parameter is stored on, for example, the HDD 33. Alternatively, the aggregation result for each item of the key parameter can be output to a device external to the host computer 3, or output in a prescribed output form.

The aggregation result for each item of the key parameter can be converted into the XML (Extensible Markup Language). The XML is widely used as a language for describing the output form. Accordingly, the conversion of the aggregation result for each item of the key parameter into the XML is advantageous in that the output form described in the XML can be utilized by other systems.

The conversion of the aggregation result for each item of the key parameter into the XML is performed by, for example, converting the data in the hierarchical tree into the XML. The technology for converting the data in the hierarchical tree into the XML is well known and thus will not be described herein in detail. For example, the data in the hierarchical tree and the XML can be converted to each other through cascade data.

Figure 6:
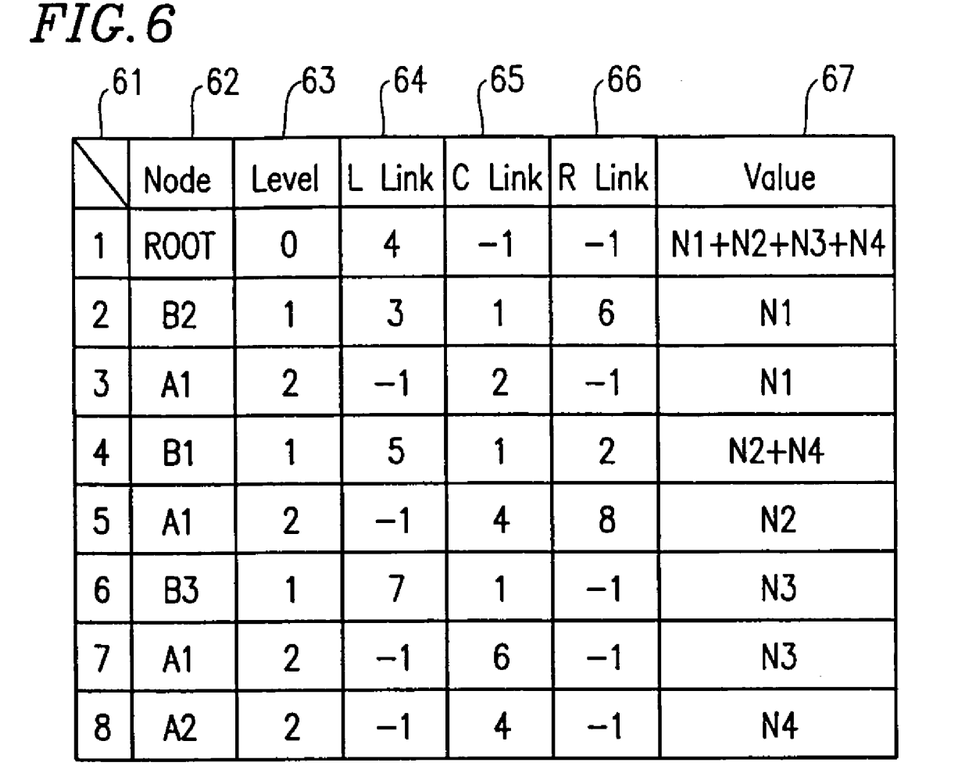
FIG. 6 shows a table representation of the hierarchical tree shown in FIG. 4.

FIG. 6 is an exemplary representation of the hierarchical tree in the state of (e) shown in FIG. 4.

In the example shown in FIG. 6, the hierarchical tree is represented by a table having columns 61 through 67.

The column 61 represents the address of each node. The column 62 represents the name of each node. The column 63 represents the hierarchical level of each node. The column 64 represents the pointer pointing to a child node (i.e., one node on a level lower by one than that of each node). The column 65 represents the pointer pointing to a parent node (i.e., one node on a level higher by one than that of each node). The column 66 represents the pointer pointing to a younger sibling node (i.e., one node on the same level as that of each node). The column 67 represents the value of each node. The value of a pointer of "−1" indicates that there is no node pointed by the pointer.

Links between the nodes (i.e., L link, C link, and R link) are realized by the pointers shown in the columns 64 through 66.

The above-described automatic aggregation processing program, which is applicable to any type of applications having a hierarchical tree once the input form is designed, has a wide variety of uses.

The automatic aggregation processing program is applicable to, for example, a "time-series (input-output) model", a "component development model", an "input-output model", and a "hierarchical responsibility reporting model". In the above-described example, the automatic aggregation processing program is applied to the "hierarchical responsibility reporting model".

Figure 7:
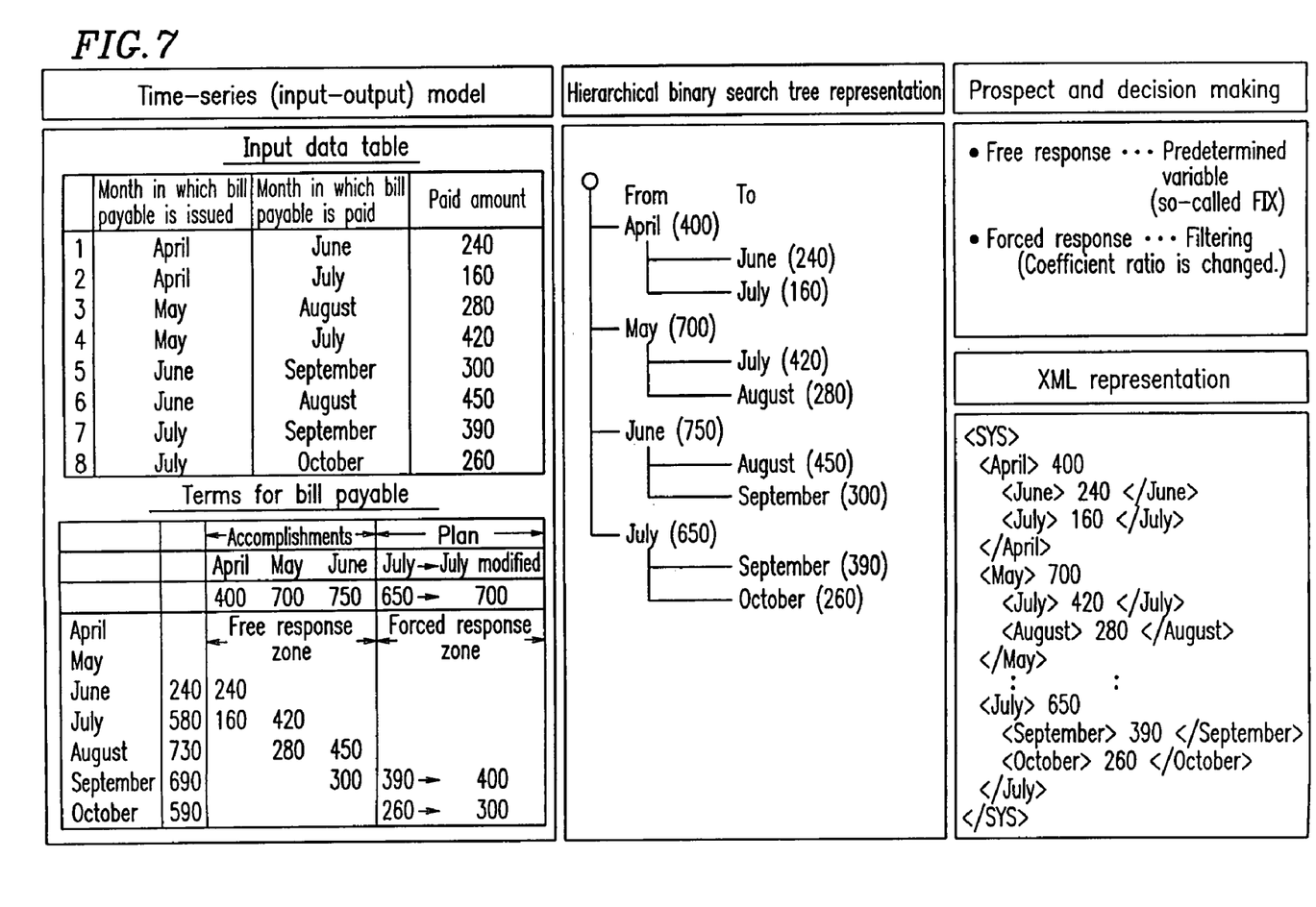
FIG. 7 shows an example of a "time-series (input-output) model"
Figure 8:
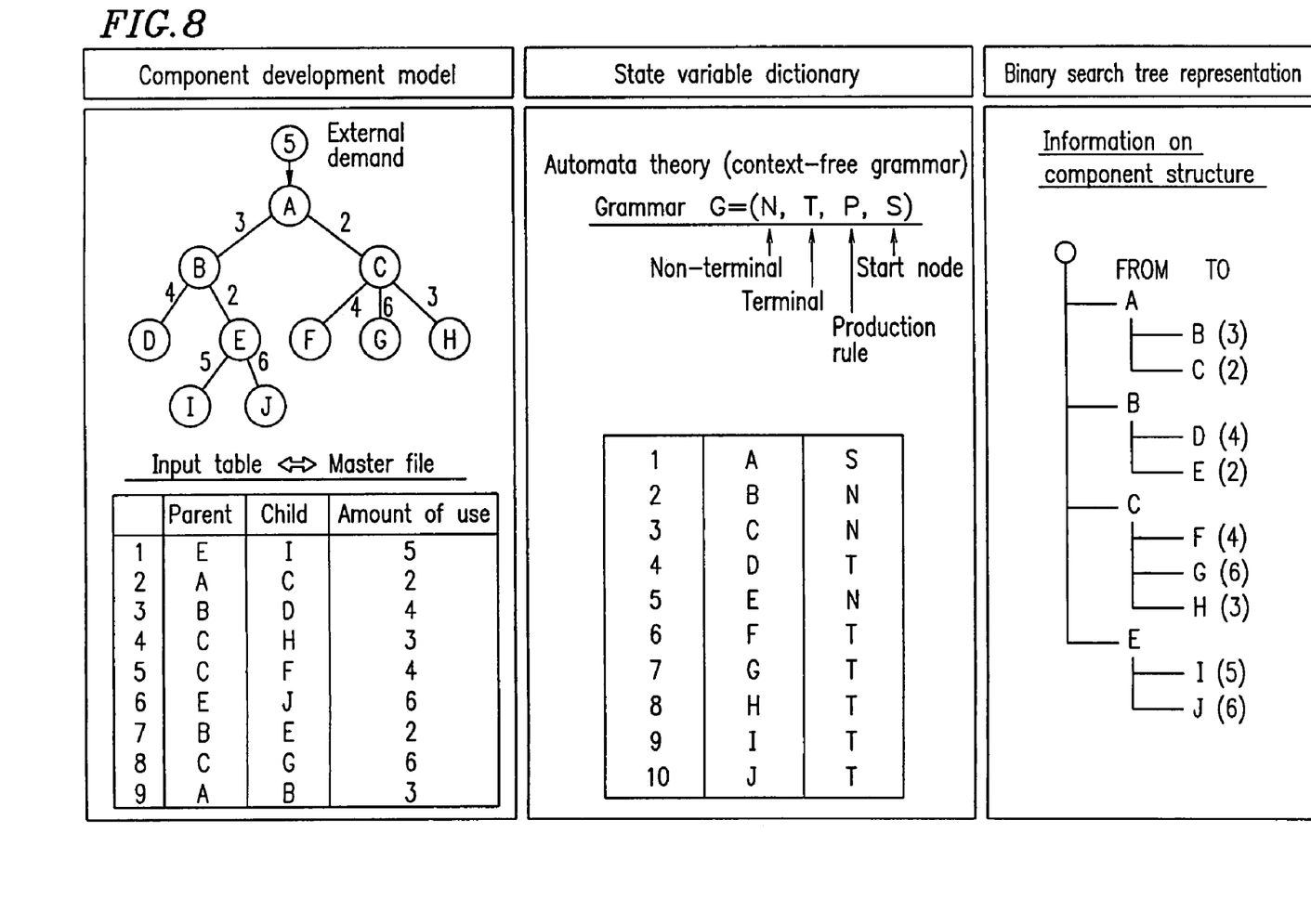
FIG. 8 shows an example of a "component development model"
Figure 9:
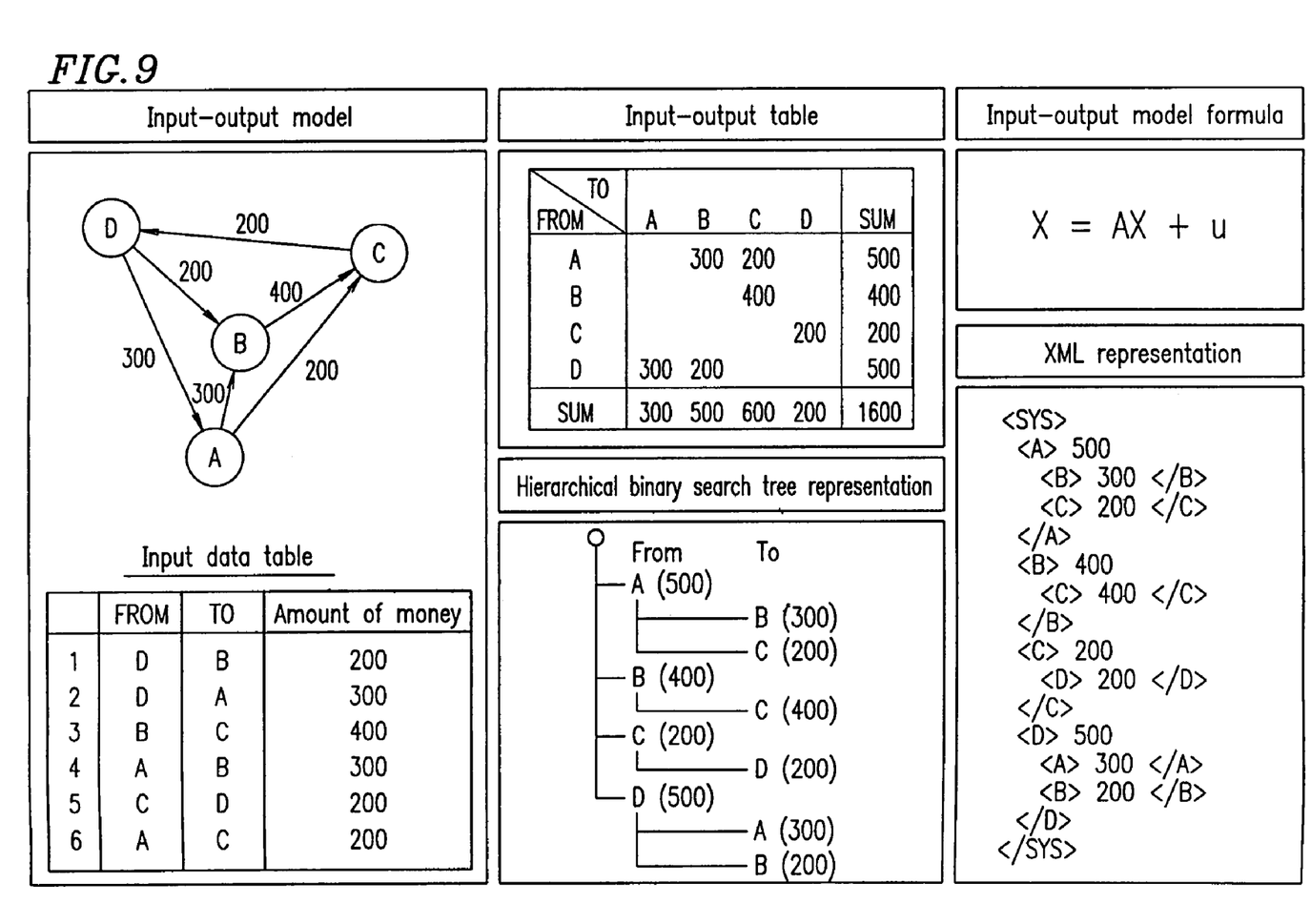
FIG. 9 shows an example of an "input-output model".

FIG. 7 shows an example of the "time-series (input-output) model", FIG. 8 shows an example of the "component development model", and FIG. 9 shows an example of the "input-output model".

The above-described automatic aggregation processing program is also referred to as a "generalized filtering program" since it generates an output form by filtering an input form.

Use of the "generalized filtering program" provides a significant effect that the necessity of rewriting the program for each application is eliminated. A desired function of any specific application can be achieved only by inputting the input form designed for that application to the "generalized filtering program".

According to the present invention, the value of the node is updated simultaneously with addition of the contents of the input record to the hierarchical tree. The aggregation result for each item of the key parameter is obtained as a value of the node on a specific hierarchical level. Thus, even a huge number of records can be instantaneously aggregated.

By an experiment performed by the present inventor, the conventional method requires 50 minutes to aggregate 10,000,000 records to 3,000 accounts, whereas the method according to the present invention requires only 50 seconds to aggregate the same number of records to the same number of accounts. This clearly indicates the significant effect of the present invention.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An automatic aggregation method for automatically aggregating a plurality of records using a computer, the plurality of records each including a plurality of items including a key parameter and a numerical value which is at least related to the key parameter, the method comprising the steps of:
   (a) inputting one of the plurality of records to the computer;
   (b) adding at least one node, representing contents of the input record, to a position, corresponding to the key parameter included in the input record, of a hierarchical tree;
   (c) updating a value of the at least one node added to the hierarchical tree and a value of a node on a level higher than that of the at least one node, in accordance with the numerical value included in the input record; and
   (d) repeating steps (a) through (c) until all the plurality of records are processed, thereby outputting an aggregation result for each of items of the key parameter,
   wherein step (b) comprises a step of determining whether a node corresponding to the key parameter already exists in the hierarchical tree, wherein:
      (b1) if it is determined that the node corresponding to the key parameter already exists, then a new node corresponding to the key parameter is not added, and at least one node corresponding to a parameter which is not the key parameter is added to the hierarchical tree; and
      (b2) if it is determined that the node corresponding to the key parameter does not exist, then a new node corresponding to the key parameter and at least one node corresponding to a parameter which is not the key parameter are added to the hierarchical tree.

2. An automatic aggregation method according to claim 1, wherein the hierarchical tree is represented by a table including a pointer pointing to one node on a level lower by one than that of each node included in the hierarchical tree, a pointer pointing to one node on the same level as that of each node included in the hierarchical tree, and a pointer pointing to one node on a level higher by one than that of each node included in the hierarchical tree.

3. An automatic aggregation method according to claim 1, further including the step of converting the aggregation result for each of the items of the key parameter into the Extensible Markup Language.

4. An automatic aggregation apparatus for automatically aggregating a plurality of records using a computer, the plurality of records each including a plurality of items including a key parameter and a numerical value which is at least related to the key parameter, the apparatus comprising:
   a control section for executing automatic aggregation processing, which includes the steps of:
   (a) inputting one of the plurality of records to the computer;
   (b) adding at least one node, representing contents of the input record, to a position, corresponding to the key parameter included in the input record, of a hierarchical tree;
   (c) updating a value of the at least one node added to the hierarchical tree and a value of a node on a level higher than that of the at least one node, in accordance with the numerical value included in the input record; and
   (d) repeating steps (a) through (c) until all the plurality of records are processed, thereby outputting an aggregation result for each of items of the key parameter,
   wherein step (b) comprises a step of determining whether a node corresponding to the key parameter already exists in the hierarchical tree, wherein:
      (b1) if it is determined that the node corresponding to the key parameter already exists, then a new node corresponding to the key parameter is not added, and at least one node corresponding to a parameter which is not the key parameter is added to the hierarchical tree; and
      (b2) if it is determined that the node corresponding to the key parameter does not exist, then a new node corresponding to the key parameter and at least one node corresponding to a parameter which is not the key parameter are added to the hierarchical tree.

5. An automatic aggregation apparatus according to claim 4, wherein the hierarchical tree is represented by a table including a pointer pointing to one node on a level lower by one than that of each node included in the hierarchical tree, a pointer pointing to one node on the same level as that of each node included in the hierarchical tree, and a pointer pointing to one node on a level higher by one than that of each node included in the hierarchical tree.

6. An automatic aggregation apparatus according to claim 4, further including the step of converting the aggregation result for each of the items of the key parameter into the Extensible Markup Language.

7. A computer readable recording medium having a program, stored thereon, for causing a computer to execute automatic aggregation processing for automatically aggregating a plurality of records, the plurality of records each including a plurality of items including a key parameter and a numerical value which is at least related to the key parameter, the automatic aggregation processing, which includes the steps of:
   (a) inputting one of the plurality of records to the computer;

(b) adding at least one node, representing contents of the input record, to a position, corresponding to the key parameter included in the input record, of a hierarchical tree;

(c) updating a value of the at least one node added to the hierarchical tree and a value of a node on a level higher than that of the at least one node, in accordance with the numerical value included in the input record; and (d) repeating steps (a) through (c) until all the plurality of records are processed, thereby outputting an aggregation result for each of items of the key parameter, wherein step (b) comprises a step of determining whether a node corresponding to the key parameter already exists in the hierarchical tree, wherein:

(b1) if it is determined that the node corresponding to the key parameter already exists, then a new node corresponding to the key parameter is not added, and at least one node corresponding to a parameter which is not the key parameter is added to the hierarchical tree; and (b2) if it is determined that the node corresponding to the key parameter does not exist, then a new node corresponding to the key parameter and at least one node corresponding to a parameter which is not the key parameter are added to the hierarchical tree.

* * * * *